C. I. CARRICO & B. HAWKINS.
LIQUID VOLUME RECORDER.
APPLICATION FILED FEB. 17, 1909.

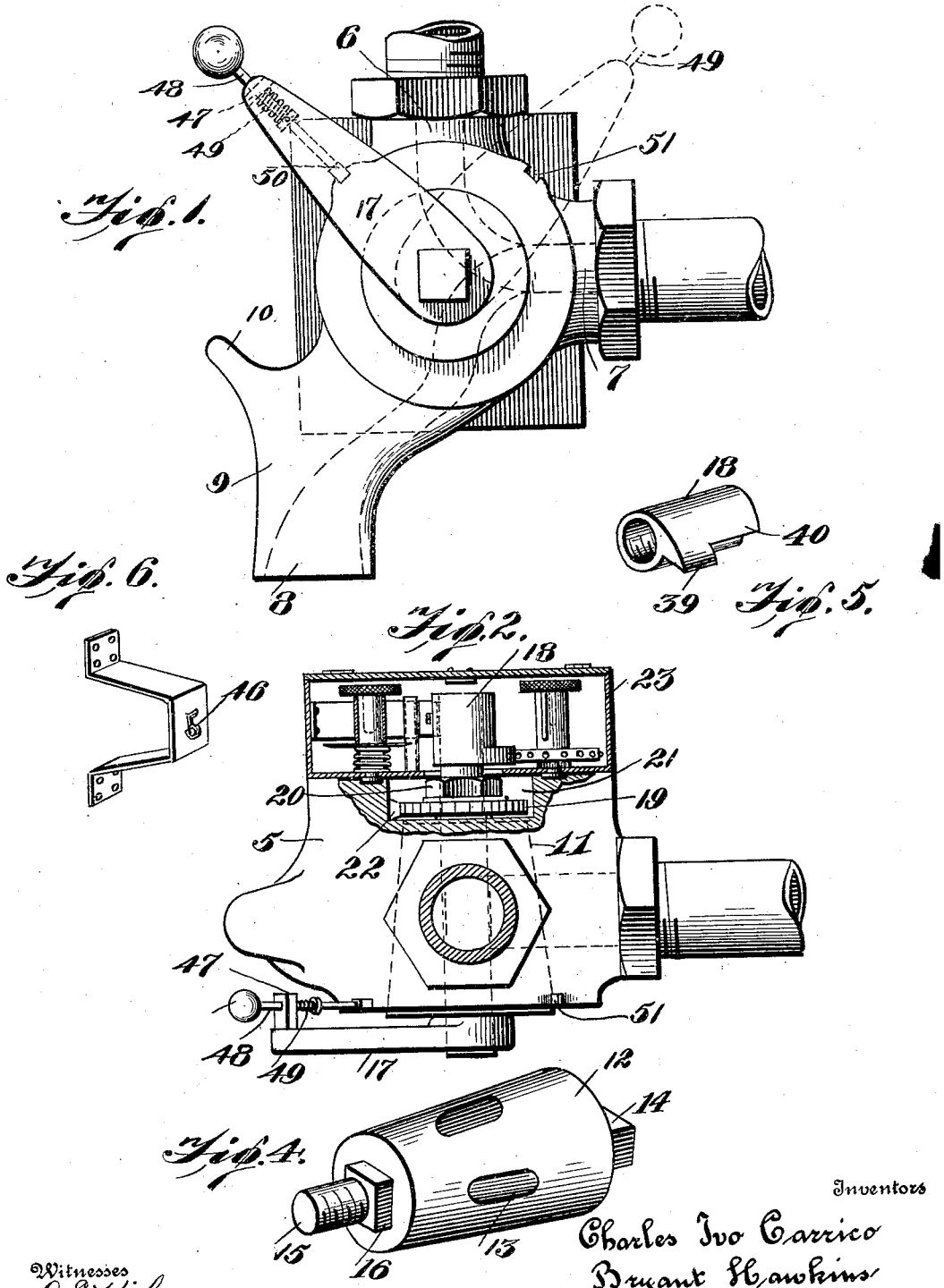

941,007.

Patented Nov. 23, 1909.
2 SHEETS—SHEET 2.

Witnesses
D. C. Wilson
E. N. Geary

Inventors
Charles Ivo Carrico
Bryant Hawkins
By William T. Jones.
Attorney

UNITED STATES PATENT OFFICE.

CHARLES IVO CARRICO AND BRYANT HAWKINS, OF OWENSBORO, KENTUCKY, ASSIGNORS OF THREE-FIFTHS TO SAID CARRICO AND TWO-FIFTHS TO SAID HAWKINS.

LIQUID-VOLUME RECORDER.

941,007.  Specification of Letters Patent.  Patented Nov. 23, 1909.

Application filed February 17, 1909. Serial No. 478,473.

*To all whom it may concern:*

Be it known that we, CHARLES IVO CARRICO and BRYANT HAWKINS, citizens of the United States, residing at Owensboro, in the county of Daviess and State of Kentucky, have invented certain new and useful Improvements in Liquid-Volume Recorders, of which the following is a specification.

Our invention relates to an apparatus for measuring and recording quantities of liquid drawn from receptacles.

The primary object of the invention is to provide means which may be readily attached to and detached from one or more liquid containing receptacles to simultaneously record and measure a predetermined quantity of liquid.

Another object of the invention is the provision of an apparatus of the class set forth which may be connected to main and auxiliary tanks, the latter constituting a measuring receptacle, by virtue of which organization the employee or attendant in charge may readily manipulate the apparatus to obtain predetermined quantities of liquid and at all times be cognizant of the exact quantity of liquid that has been sold or otherwise disposed of and of the amount of liquid that remains in the main receptacle or tank. On the other hand, it will appear manifest that an arrangement of this kind will prevent an employee or other person from surreptitiously withdrawing any of the liquid contained in the tanks, thus subserving the interests of the employer and saving vast quantities of liquid.

The invention is further directed to the employment of the apparatus in conjunction with a pair of main receptacles or tanks with resultant advantages in obtaining suitable admixtures of different liquids and the saving of time, money and labor as hereinbefore set forth.

Generally speaking, the invention involves a two-way valve, a casing, and recording mechanism which is so arranged with respect to said valve that the movements thereof are at all times in consonance with the operation of the valve to cause the recordation of the precise quantities of liquid drawn off and at the same time preclude any possibility of the movement of the valve in but one direction.

To the accomplishment of the recited objects, and others coördinate therewith, the preferred embodiment of our invention resides in that arrangement and construction of parts hereinafter described, illustrated in the accompanying drawings, and embraced within the scope of the appended claims.

Figure 3:
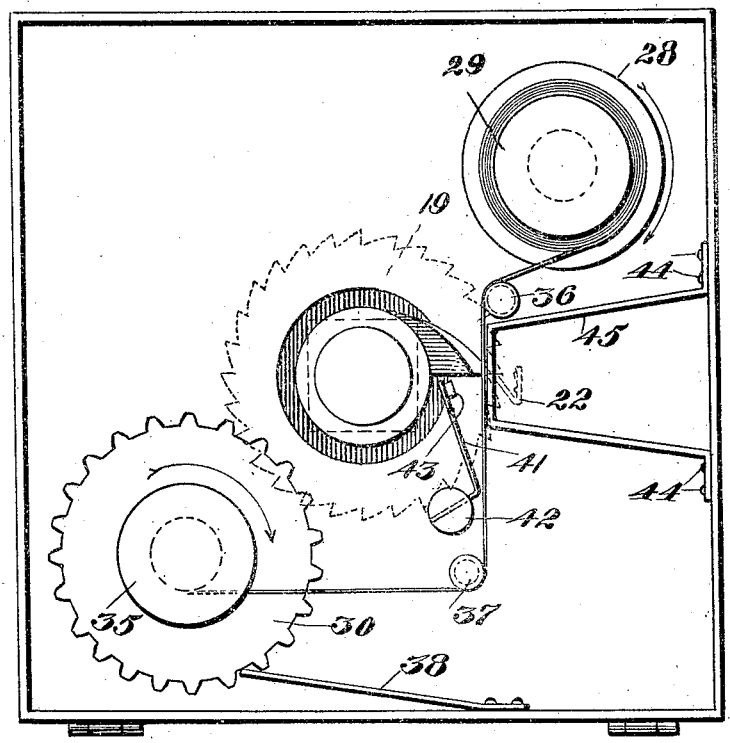
Figure 7:
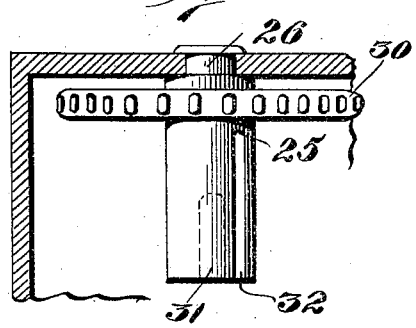
Figure 9:
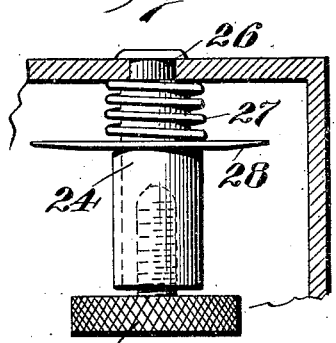
Figure 8:
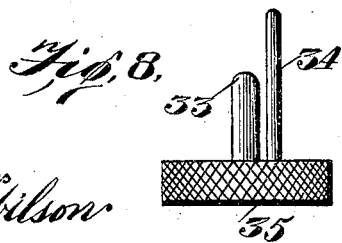

In said drawings:—Figure 1 is a side elevation of the apparatus embodying the invention. Fig. 2 is a plan view of the apparatus, a portion of the casing being broken away to more clearly illustrate the recording mechanism. Fig. 3 is a side elevation of the recording mechanism with the cover plate removed therefrom. Fig. 4 is a detail perspective view of the valve. Fig. 5 is a similar view of the cam sleeve. Fig. 6 is a detail perspective of the die-bridge. Fig. 7 is a detail sectional view of the take-up reel. Fig. 8 is a detail elevation of the tape holding device removed from the take-up reel, and Fig. 9 is a detailed view of the feed reel.

Similar reference characters designate corresponding parts throughout the several views.

Referring more particularly to the drawings for a detailed description of our invention, the numeral 5 designates a casing, which is provided with passages 6 and 7 designed for suitable connection with the liquid containing receptacles, and an outlet opening 8 formed in the spout 9, which in turn is equipped with an integral hook 10, the latter obviously serving as a rest or support for the can or other receptacle in which the liquid is desired to be discharged. The casing 5 is furthermore provided with a transverse concentric bore 11 to serve as a receptive space for the substantially frusto-conical shaped valve 12 having arranged approximately medially thereof an arcuate passage 13 which is manifestly adapted to establish alternate communication between the hereinbefore mentioned passages 6 and 7 or 7 and 8. Integrally formed with and projecting from opposite ends of the valve 12 is a squared boss 14 and a screw-threaded extension 15, the base of which is enlarged and also squared as at 16, the said boss 14 having detachable connection with the handle 17, and the extension 15 and base 16 thereof having mounted thereon the internally screw-threaded cam sleeve 18 and a ratchet 19 respectively, a nut 20 being interposed for the purpose of obtaining a secure assemblage of these parts. It will be noted in this connection that a circular depression 21 is positioned on one side of the valve casing 5 to accommodate the ratchet 19 and the nut 20, and that a spring 22 is mounted in operative relation to said ratchet to prevent any retrograde movement.

The registering mechanism is housed in a quadrilateral casing 23 the bottom of which lies contiguous one side of the valve casing 5 and is secured thereto by any suitable means. As exhibited in Fig. 3 of the accompanying drawings, we preferably mount a feed spool 24 and a take-up spool 25 in proximity to opposite corners of the casing, the said spools being rabbeted, as at 26, and being otherwise loosely secured to the bottom of said casing for free and uninterrupted rotative movement. The feed spool or reel 24 is designed to carry a coil spring 27 at its lower proximal end which exerts pressure upon the annular member 28 and forces the same longitudinally against the roll of tape 29, the upper or outer edge of the roll being held against the underneath side of the thumb screw 29. In this manner we maintain the edge of the tape even and automatically compensate for the contraction and expansion of the tape which is due to the variation of the atmospheric temperature. The take-up reel 25 has mounted at its lower terminal a peripherally toothed wheel 30 and is equipped with a concentric bore 31 and a peripheral groove 32, the latter being the longer of the two, and both being disposed in the direction of the reel. This bore and groove are designed to receive the correlative projections or pins 33 and 34 which depend from the head 35, the shorter pin serving to hold the device in proper relative position to the spool 25 and the longer pin serving to hold one end of the tape in the groove 32. The tape furthermore depends for its guidance between the reels upon the rollers 36 and 37, and a pawl 38 is located at one side of the casing 23 for positive engagement with the peripherally toothed wheel.

Upon inspection of Fig. 5 of the drawings it will be observed that the cam sleeve 18 has integrally formed therewith a pair of curvilinear projections 39 and 40 which mesh in proper sequence with the teeth of the wheel 30 and the leaf spring 41, as will be presently set forth. The lower extremity of this leaf spring is deflected at substantially right angles and is secured to the vertically disposed post 42, and the upper extremital portion carries a punch 43 having in this instance the general conformation of Fig. 5. Being secured to one side of the casing by rivets or other suitable fastening means, as 44, and projecting inwardly a sufficient distance so that its outer flat surface will be in juxtaposition to the punch 43 when the latter is operated, is a bridge 45. A corresponding die 46 is positioned medially of the flat surface of the bridge and is designed to have exact registration with the punch 43 and furthermore dispose of the particles of waste paper that are punched from the tape. It will be noted that the tape traverses the flat portion of the bridge, and, owing to the disposition of the guide rollers 36 and 37, is always maintained in close contact therewith and is prevented from being subjected to any lateral displacement.

For maintaining the valve in its proper relative position, we have devised the following arrangement and construction. The outer terminal of the handle 17 is provided with a depending projection 47 designed to support a rod 48, upon which is suitably mounted a coil spring 49, the inner end of said rod being enlarged, as at 50, for engagement with the depressions 51 on the edge of the valve casing. It will be seen that upon oscillating the valve handle 17 the spring will cause the enlarged portion 50 of the rod 48 to engage either of the depressions 51 and thereby automatically lock said handle against movement. As will appear manifest, the handle may be readily disengaged by pulling on the rod 48.

In practical operation, and assuming that the passages 6 and 7 are connected respectively to main and ancillary tanks, and the capacity of the latter is five gallons, the passages 6 and 7 normally communicate, as shown in Fig. 1 of the drawings. Now when it is desired to discharge the contents of the ancillary measuring vessel it only becomes necessary to oscillate the handle 17 and cause the passage 13 of the valve 12 to set up communication with the passages 7 and 8 of the casing, as indicated by dotted lines in Fig. 1 of the drawings. Simultaneously with the movement of the valve a commensurate movement of the cam sleeve 18 takes place, the lower projection 40 engaging and advancing one point a tooth on the take-up reel 30, thereby unwinding the tape from the feed roll 24. Upon still further rotation of the cam sleeve 18 the topmost projection 39 impinges against the rear side of the leaf spring 41 which is in the path of movement, and forces said spring against the flat surface of the bridge 45 and causes the punch 43 to be placed in registration with the die 46 so that the figure 5 will be cut into the tape. By this time the recording mechanism will have reached its normal position and the passage 13 of the valve 12 will again establish communication between the given tanks.

It should be understood that in its broader aspects our invention comprehends the employment not only of the means described but of equivalent means for performing the recited functions. The adaptability of the device to main and ancillary tanks has only been described by way of exemplification as it will appear obvious that the apparatus is intended to supply a vast field of utility. While the arrangement shown is thought, at the present time, to be preferable, it is desired to reserve the right to effect such modifications and variations thereof as may come fairly within the scope of the appended claims.

Having thus described our invention, what we claim as new, is:—

1. The combination with a valve and a casing therefor, of a housin carried by said casing, a cam sleeve having a pair of projections and movable with said valve, a tape feed reel, a take-up reel, and means actuated by said projections for advancing the tape and recording thereon the actuations of the valve.

2. The combination of a valve movable in one direction only and a casing therefor, of a housing carried by said casing, a cam sleeve having a pair of projections and movable with said valve, a tape feed reel, a take-up reel, and means actuated by said projections for advancing the tape and recording thereon the actuations of the valve.

3. The combination with a valve and a casing therefor, of a housing carried by said casing, a cam sleeve having a pair of projections movable with said valve, a tape feed reel, a take-up reel having a peripherally toothed wheel, a punch, a bridge having a die for said punch, one of said projections being designed for engagement with the teeth of said wheel to cause the tape to advance and the other projection adapted to sequentially force the punch in contact with the paper for recording the actuations of the valve.

4. The combination with a valve and a casing therefor, of a detachable cam sleeve movable with said valve and having a pair of projections, a tape feed reel, a take-up reel, means actuated by said projections for advancing the tape and recording thereon the actuations of the valve.

5. The combination with a valve and a casing therefor, of punching recorder mechanism, a handle for said valve, a spring pressed rod carried by said handle, said casing having depressions therein which are adapted to receive one terminal of said rod and thereby lock the handle with respect to the casing.

6. The combination with a valve and a casing therefor, of a tape feed reel, a take-up reel, said take-up reel having a concentric bore and a peripheral groove, a head having pins adapted to removably engage said bore and groove, and means actuated by the movement of the valve for advancing the tape and recording the actuations of the valve.

7. The combination with a valve and a casing therefor, of a tape feed reel, a sleeve for said reel, said sleeve having an annular flange, a coil spring adapted to engage said flange and force the latter in engagement with the tape, a take-up reel, and means actuated by the movement of the valve for advancing the tape and recording thereon the actuations of the valve.

8. The combination with a valve and a casing therefor, of a tape feed reel, a take-up reel, a sleeve for said feed reel, said sleeve having an annular flange, a coil spring adapted to engage said flange and force the latter against the tape, said take-up reel having a concentric bore and a peripheral groove, a head having pins adapted to enter said bore and groove, and means actuated by the movement of said valve for advancing the tape and recording thereon the actuations of the valve.

In testimony whereof we hereunto affix our signatures in presence of two witnesses.

CHARLES IVO CARRICO.
BRYANT HAWKINS.

Witnesses:
M. DALY,
J. T. BURCH.